United States Patent [19]

Tsui et al.

[11] Patent Number: 4,804,300

[45] Date of Patent: Feb. 14, 1989

[54] GUN DRILL COOLANT BUSHING AND METHOD OF MAKING SAME

[75] Inventors: Gary Tsui, Rosemead; Thomas Heimbigner, Bellflower, both of Calif.

[73] Assignee: CBC Industries, Inc., Los Angeles, Calif.

[21] Appl. No.: 6,878

[22] Filed: Jan. 27, 1987

Related U.S. Application Data

[63] Continuation-in-part of Ser. No. 725,102, Apr. 19, 1985, abandoned, Ser. No. 895,477, Aug. 11, 1986, Pat. No. 4,770,570, and Ser. No. 928,201, Dec. 12, 1986, abandoned.

[51] Int. Cl.⁴ .................... B23B 51/06; B23B 41/02
[52] U.S. Cl. ........................................ 408/56; 408/59; 408/61
[58] Field of Search ................ 408/56, 57, 59, 60, 408/72 R, 72 B, 61

[56] References Cited

U.S. PATENT DOCUMENTS 2,811,875 11/1957 Cogsdill .......................... 408/59 X
4,588,334 5/1986 Khurana .......................... 408/61

FOREIGN PATENT DOCUMENTS 515943 12/1952 Belgium ............................ 408/59
837794 2/1939 France ............................. 408/59

Primary Examiner—Gil Weidenfeld
Assistant Examiner—Steven C. Bishop
Attorney, Agent, or Firm—Beehler, Pavitt, Siegemund, Jagger, Martella & Dawes

[57] ABSTRACT

As an alternative to the drilling of relatively long holes through a mass of material to provide a passage for fluid coolant the invention makes use of a laterally open elongated slot cut into the mass of material into which easily worked material is embedded to form the fluid passage. One alternative is to lay a preformed length of tube in the slot and secure the tube in place with an appropriate bedding mass. Another is to make use of a molding expedient, namely, packing the passage with a moldable material in which an elongated core is embedded and then removing the core to form the fluid passage.

6 Claims, 2 Drawing Sheets

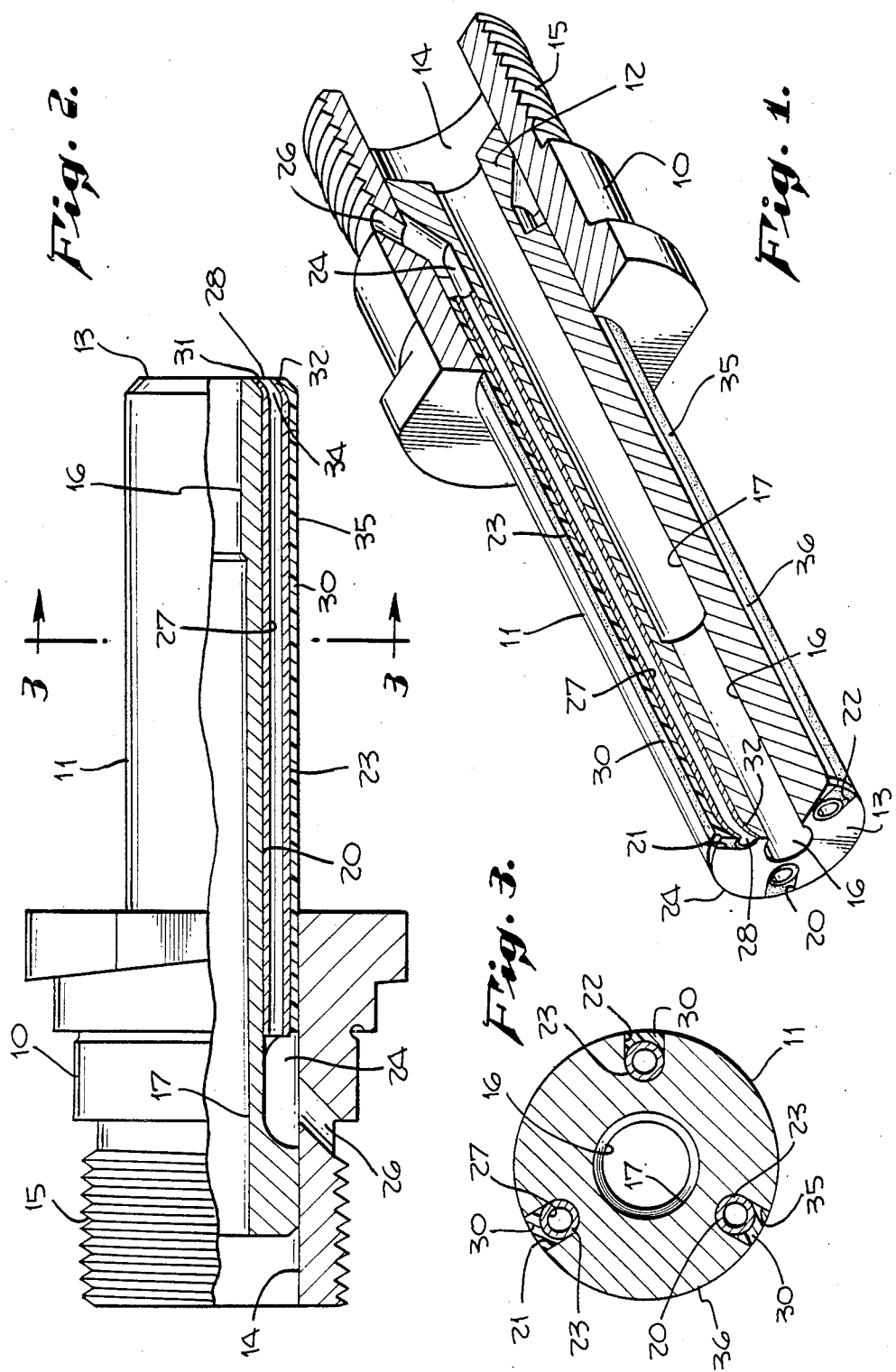

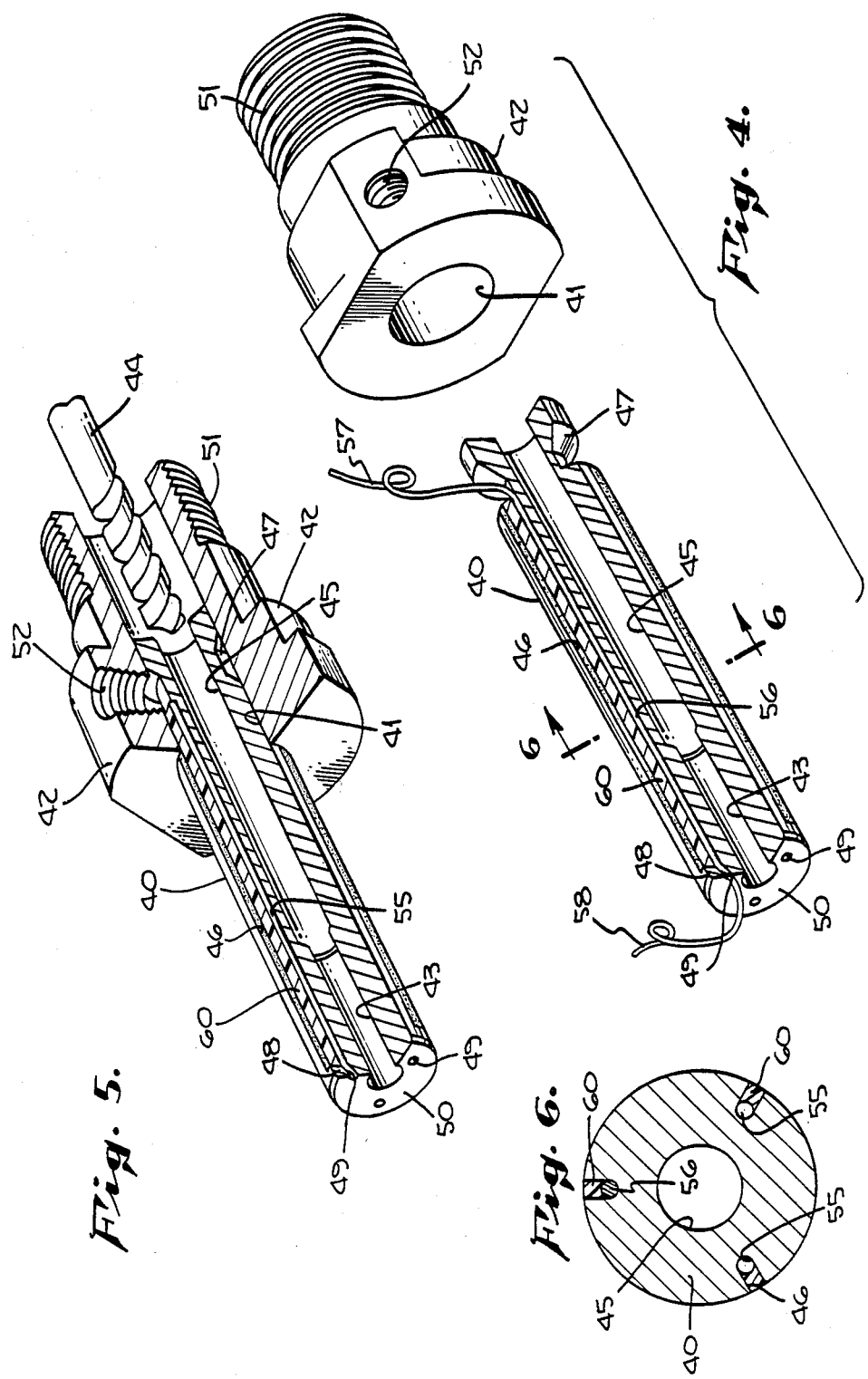

GUN DRILL COOLANT BUSHING AND METHOD OF MAKING SAME

This is a continuation-in-part of co-pending applications Ser. No. 725,102, filed Apr. 19, 1985, now abandoned, Ser. No. 895,477 filed Aug. 11, 1986, now U.S. Pat. No. 4,770,570, and Ser. No. 928,201, filed Dec. 12, 1986, now abandoned.

The forms of invention here involved have reference to a coolant handling device for a tool, the function of which is to carry coolant from an appropriate source through a tool guide through which the tool extends and then direct the coolant toward the tool location and particularly to the focus of the operation where the tool is doing its work.

More particularly the invention is directed to the structure of a coolant directing passage means within the material of the tool guide which replaces drilled holes in the tool guide which is an easier and more time-saving manufacturing process, without in any way causing a sacrifice in the effectiveness of the coolant.

In a simpler form of the invention there is a method applicable to construction of the coolant passages which adds appreciably to economy in the manufacturing process.

Drill bushings are and have been widely used in the operation of guide drills and reamers. In the metal working industries, applying coolant to the cutting tool in a proper place has become critical in most drilling and reaming operations. Accordingly, addition of a coolant port on the working part of the device should be one to allow passage of coolant through appropriate orifices of the bushing shank directly to the cutting edge of the tool.

It is therefore among the objects of the invention to provide a new and improved coolant device for tools in the nature of power feed drills which provides an appropriate continuous flow of coolant directly to the cutting edge of the tool.

Another object of the invention is to provide a new and improved coolant device for cutting tools of a character such that the coolant is fed constantly to the workpiece, whereby to serve also as a lubricating fluid to help dissipate friction heat and to extend tool life.

Still another object of the invention is to provide a new and improved coolant device for cutting tools of a nature enabling the coolant passage to be built and installed in a more dependable manner materially less costly than those expedients heretofore in practice.

A further object of the invention is to provide a new and improved coolant device for conducting coolant to a tool of an innovative character enabling relatively long passageways for coolant to be built in a manner to avoid costly drilling operations, especially those wherein frequent breaking of drilling tools during the manufacturing process is avoided, thereby to lower overall production costs.

Included further among the objects of the invention is to provide a new and improved efficient, dependable and relatively inexpensive coolant device capable of directing a continuous flow of coolant to the cutting edge sufficiently well directed so that the force of the coolant flow is capable of forcing chips away from the workpiece.

The objects include also such a coolant device capable of constant feed of coolant directly to the cutting edge in order to dissipate heat and accordingly extend the tool life, the coolant being made to serve as a lubricant whereby galling is reduced, as is also the dulling effect on the cutting edge of the tool, the result of which is an increase in surface finish and reduction in rejection rates in addition to adding to tool life.

With these and other objects in view, the invention consists of the construction, arrangement, and combination of the various parts of the device serving as examples of various embodiments of the invention, whereby the objects contemplated are attained, as hereinafter disclosed in the specification and drawings, and pointed out in the appended claims.

In the drawings:

FIG. 1 is a side perspective view of one form of the device partially broken away to show interior construction.

FIG. 2 is a side elevational view of the form of FIG. 1 partially broken away.

FIG. 3 is a cross-sectional view taken on the line 3—3 of FIG. 2.

FIG. 4 is a side perspective exploded view of a modified form of the device partially broken away to show an acceptable step in the course of manufacture.

FIG. 5 is a side perspective view of the device of FIG. 4 partially broken away to show a finished product.

FIG. 6 is a cross-sectional view on the line 6—6 of FIG. 4.

In the form of the invention of FIGS. 1, 2 and 3 there is a body 10 within which is located a shank 11 having a captive end 12 secured within the body 10 and a free end 13. An axial hole 14 through the body accommodates the shank. On the exterior of the body there may be provided a threaded end 15 for attachment to a conventional power tool (not shown). Within the shank 10 is an axial bore 16 for reception of a tool in the nature of a drill bit or other cutting tool. There may, if preferred, be an interior enlargement 17 of the bore 16.

To produce the form of invention of FIGS. 1, 2 and 3, three circumferentially spaced elongated coolant recesses 20, 21 and 22 are made in the bushing shank 11. Each of the coolant recesses is preferably cut through the cylindrical exterior surface of the bushing shank as, for example, by use of a milling cutter, radially inwardly to a depth in excess of the diameter of a tube 23. Each tube extends from a free end 13 of the bushing shank 11 into engagement with an annular coolant distribution recess 24 adjacent to the opposite end. An obliquely disposed coolant inflow passage 26 supplies the distribution recess 24 from a location where it can be reached by coolant from a conventional supply line (not shown).

Although a milled recess is particularly acceptable, an oversize recess of other description may be employed as, for example, an oversize bored hole of diameter sufficient to contain a tube 23 and the requisite bedding material.

By making use of milled coolant recesses 20, 21 and 22, manufacturing problems may be effectively minimized as compared with those experienced, for example, by an operation where coolant passageways are drilled. When the shank is a long one, a number of drills may be broken before a single passage is completely drilled through the metal of the shank. The tubes 23, one of which is used in each of the recesses, provide coolant passageways 27 from the distribution recess 24 to an outlet end 28. The tubes 23, designated micro tubes for some installations, may be of metallic material such as copper, aluminum, or metal compositions of other conventional nature. In the alternative, use may be made, for example, of an appropriate synthetic plastic resin material. The essence of the improvement is in the provision of a preformed tube which is embedded in the recess. To anchor the tubes 23 in the corresponding recess resort may be had to an appropriate synthetic plastic resin material 30 in which the tube is embedded, after which the plastic material hardens. Other appropriate conventional bedding compounds may also be used. One found especially acceptable is that of a mixture of 50% epoxy resin and 50% powdered metal such as powdered steel. Whichever may be chosen it should be capable of being finally trimmed down to a surface 35 coincident with the exterior surface 36 of the bushing shank 20.

In order to direct coolant outflow obliquely inward toward the axis of the bore 16, the innermost corner 31 of the recess may be beveled to make possible bending the corresponding end 32 of the tube obliquely inwardly. The direction of the bend may be varied depending on the coolant flow desired. It may also be desirable to reduce the inside diameter of the tool 23 at the outflow end to provide, in effect, a nozzle 34.

As an alternative to produce that form of the invention shown in FIGS. 4, 5 and 6, a multiple number of coolant passageways are found to be preferable, here illustrated as being three.

On this occasion a shank 40 has a fixed position in a cylindrical passage 41 through a body 42. The shank accommodates an axial bore 43 for reception of a tool 44. The tool is adapted to enter through a larger entrance bore 45. On the body 42 is a threaded end 51 for attachment to a conventional power tool. There is also a supply port 52 for coolant.

To form each of the coolant passages, numbering three in the chosen embodiment, a recess 46 is made in the wall of the shank as, for example, being cut into the outside surface, extending from an annular coolant distributing groove 47 at the captive end of the shank to a location adjacent the free end. A wall 48 of shank material is left at the free end of the shank. To provide an outlet, a hole 49 is made, usually by drilling from an end face 50 of the shank into the adjacent end of the recess 46. The hole 49 is obliquely disposed and directed toward the long axis of the bore 43 of the shank.

The shape and size of an actual coolant passageway 55 is established by a thread 56 which is laid in the recess 55 with opposite ends 57 and 58 of indiscriminate length exposed. The end 58 is pulled through the oblique hole 49 and the end 57 pulled outwardly of the groove 47. A bedding material 60 is then packed in the recess around the thread 56.

An appropriate material for the thread may be wax or a wax-like material of relatively low melting point. The bedding material is preferably a material of relatively higher melting point and which at ambient temperature is firm and capable of being machined off to a surface flush with the exterior surface of the shank. An epoxy resin with or without a filler of powdered metal may be used for the bedding material.

After the thread has been embedded as described, the shank is heated sufficient to liquefy the material of the thread, which is permitted either to be pulled out or to flow out of the recess leaving a clear hole through the recess 46 which becomes the coolant passageway 55.

Although a wax-like thread of the kind described may be found to be preferable, it should be appreciated that the thread material may be of some other type sufficient to hold its shape while being embedded but which is capable of being subsequently caused to shrink or to disintegrate and be expelled from the recess to clear the coolant passageway.

While particular embodiments of the present invention have been shown and described, it will be obvious to those skilled in the art that changes and modifications may be made without departing from the invention in its broader aspects and, therefore, the aim of the appended claims is to cover all such changes and modifications as fall within the true spirit and scope of the invention.

Having described the invention, what is claimed as new in support of Letters Patent is as follows:

1. A coolant handling device for a tool for directing a flow of coolant through the device toward a working portion of the tool, said device being in the nature of a coolant directing assembly comprising a shank having an axial bore for reception of the tool and an exposed peripheral surface, said shank having opposite first and second ends between which said bore extends providing through communication between said ends and coolant directing passage means of fixed length extending between said ends, said coolant passage means comprising a longitudinally disposed recess extending from the exposed peripheral surface radially inwardly for a portion of the wall thickness of said shank, a mass of material lodged in said recess and having its outer surface exposed and means forming a passageway through said mass of material beneath the outer surface for conducting coolant between said ends at a location spaced radially outwardly from the axial bore of the shank.

2. A coolant handling device as in claim 1 wherein the mass of material is a synthetic plastic resin material and the passageway is a molded bore in the mass of material, said bore being of fixed length and relatively straight between said ends and having an axis parallel to the axis of said axial bore.

3. A coolant handling device as in claim 1 wherein there is an opening in the material of the shank between the passageway and the free end of the shank, the opening being in an oblique direction toward the axial bore of the shank, said opening having a lining comprising a portion of said mass of material which is lodged in the recess.

4. A coolant handling device for a tool guide for directing flow of a coolant toward the cutting edge of a cutting tool, said device being in the nature of a coolant directing assembly comprising a body having releasable attachment means for engagement with a conventional power tool and a shank extending from said body, said shank having an axial bore for reception of the cutting tool, said shank having a free end adapted to extend outwardly of said body and a captive end in engagement with said body, coolant directing passage means extending between the captive end of said shank and an outlet at the free end of said shank for passing coolant through said shank to said free end, interconnecting passage means in the body extending between a coolant inlet and the coolant directing passage means, said coolant directing passage means comprising a recess in the wall of the shank and spaced radially outwardly of said bore, a bedding means in said recess and means forming a coolant passageway in said bedding means.

5. A coolant handling device as in claim 4 wherein there is a yieldable tubular member in said recess, said bedding means being a vehicle for holding said tubular member in place and end of the yieldable tubular member at the free end of the shank having a bent portion directed obliquely inwardly toward the longitudinal axis of the shank.

6. A coolant handling device as in claim 5 wherein there is a plurality of said coolant directing passage means at circumferentially spaced locations in said shank, each passage means being relatively straight between said ends and having an axis parallel to the axis of said axial bore.

* * * * *